United States Patent [19]

Hill et al.

[11] Patent Number: 5,154,028
[45] Date of Patent: Oct. 13, 1992

[54] FLUSH MOUNTED VEHICLE GLAZING

[75] Inventors: David A. Hill, Royal Oak; Louis R. Csokasy, Bloomfield Hills, both of Mich.; Peter J. Kubizne, Elkhart, Ind.

[73] Assignee: Excel Industries, Inc., Elkhart, Ind.

[21] Appl. No.: 758,337

[22] Filed: Aug. 28, 1991

Related U.S. Application Data

[63] Continuation of Ser. No. 662,261, Feb. 28, 1991, abandoned, which is a continuation of Ser. No. 523,271, May 14, 1990, abandoned, which is a continuation of Ser. No. 312,689, Feb. 21, 1989, abandoned.

[51] Int. Cl.5 .................................................. E04B 3/00
[52] U.S. Cl. ........................................ 52/208; 296/93; 296/201
[58] Field of Search ............... 52/208, 397; 296/84 R, 296/84 A, 84 D, 93, 146, 201

[56] References Cited

U.S. PATENT DOCUMENTS

| | | | |
|---|---|---|---|
| 3,416,833 | 12/1968 | Griffith | 52/208 X |
| 3,478,475 | 11/1969 | Strack | 52/208 |
| 3,981,113 | 9/1976 | Griffin | 52/208 |
| 4,606,159 | 8/1986 | Kunert | 52/208 |
| 4,723,809 | 2/1988 | Kida et al. | 52/208 X |

FOREIGN PATENT DOCUMENTS 2520428  7/1983  France ................................ 52/208

Primary Examiner—Richard E. Chilcot, Jr.
Attorney, Agent, or Firm—James D. Hall

[57] ABSTRACT

Glazing panels which are mounted in the vehicle flush with the exterior skin. The glazing may be stationary or movable by manual or power operated assists and includes a mounting molding having a peripheral lip which extends to the vehicle skin.

3 Claims, 2 Drawing Sheets

FLUSH MOUNTED VEHICLE GLAZING

CROSS-REFERENCE TO RELATED APPLICATIONS

This is a continuation of copending application Ser. No. 07/662,261, filed on Feb. 28, 1991, now abandoned. This is a continuation of patent application Ser. No. 523,271 filed May 14, 1990 which was a continuation of application Ser. No. 312,689 filed Feb. 21, 1989, and now abandoned.

SUMMARY OF THE INVENTION

This invention relates to vehicle glazing and will have special application to glazings which are mounted flush with the outer skin of the vehicle.

Automotive windows are currently available in many constructions. The most popular type available today is one in which the window mount is encapsulated about the outer peripheral edge of the glazing panel. A typical prior automotive window of this type is shown in U.S. Pat. No. 4,761,916. Other types of windows included fasteners which extended through the glazing panel and were anchored in the vehicle frame.

The automotive window of this invention is capable of being mounted flush to the vehicle outer skin, which provides for both improved aerodynamics and aesthetics. The window may include attachment and location devices which extend into a mounting member securely attached to the inner surface of the glazing panel periphery. The mounting member in no case will encapsulate or wrap around the periphery of the glass to contact the glazing panel outer surface. The mounting member includes a flexible lip which extends to a generally coplanar part of the vehicle and which serves as a seal.

Accordingly, it is an object of this invention to provide for automotive glazing which may be flush mounted with respect to the outer skin of the vehicle.

Another object of this invention is to provide for flush mounted automotive glazing which is bonded directly to the mounting member and requires no separate fasteners to be secured to the vehicle frame.

Another object of this invention is to provide for flush mounted automotive glazing having a mounting member with a flexible lip extension.

Another object of this invention is to provide for a flush mounted automotive glazing which can be used in either stationary or movable windows.

Other objects of this invention will become apparent upon a reading of the following description.

DESCRIPTION OF THE PREFERRED EMBODIMENTS

The preferred embodiments herein described are not intended to be exhaustive or to limit the invention to the precise forms disclosed. They are chosen and described to explain the principles of the invention and their application and practical use to allow others skilled in the art to utilize its teachings.

Figure 1:
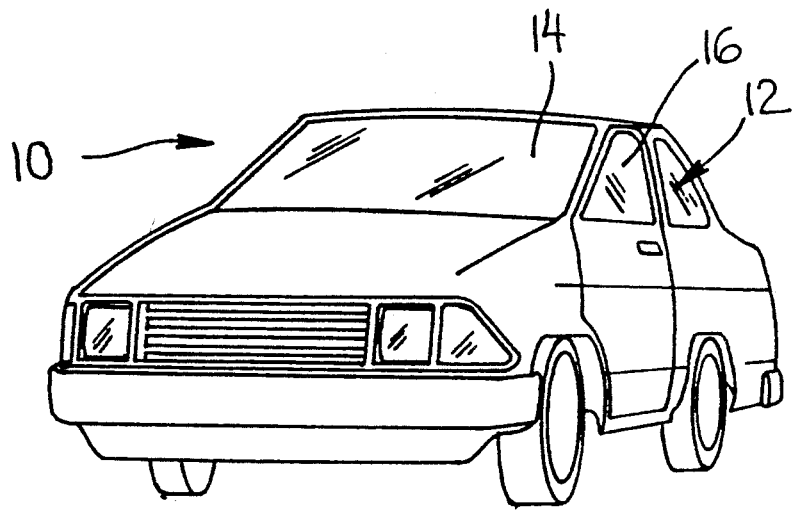
FIG. 1 is a perspective view of an automobile which employs the flush mounted glazing of this invention.
Figure 2:
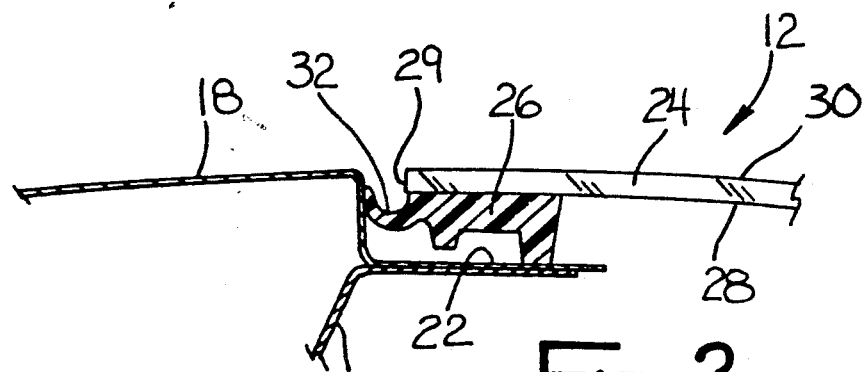
FIG. 2 is a sectional view of the glazing of this invention showing a first configuration of the mounting member with a flexible lip contacting part of the vehicle frame for a stationary window.
Figure 3:
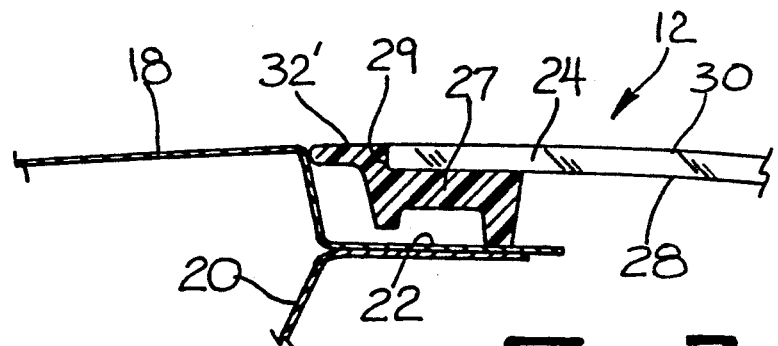
FIG. 3 is a sectional view showing a second configuration of the mounting member with a flexible lip that extends to the vehicle frame.

Referring now to FIGS. 1-3, reference numeral 10 refers generally to a vehicle in which is mounted the glazing material 12 of this invention. Glazing 12 may be employed in stationary windshield 14 and in movable side windows 16 as well as the back window (not shown) or stationary side or quarter window (not shown) and is mounted flush with respect to outer skin 18 to improve the aerodynamic response of vehicle 10.

FIGS. 2 and 3 illustrate various configurations glazing 12 may employ in a stationary window. Parts common to each embodiment are vehicle inner skin 20 which along with outer skin 18 defines window frame or support shoulder 22, a glazing panel 24, and a mounting member or inner segment 26, 27 which serves as both a connecting member and as a primary gasket seal for glazing panel 24. Inner segment 26, 27 includes a lip 32, 32' which extends to the outer skin 18 of the vehicle and which serves as a seal to fill the area between glazing panel side edge 29 and outer skin 18.

Inner segments 26 and 27 shown in FIGS. 2-3 are preferably formed of reactable polyurethane resins which are bonded directly to the periphery of glazing panel 24 by the reaction injection molding (RIM) process which is commonly known in the art. Panel 24 may be primed as required in the molding of certain resins. As shown in FIGS. 2 and 3 inner segment 26 or 27 is joined only to the inner surface 28 of glazing panel 24 and is also joined to window support shoulder 22 as by a conventional adhesive. By so mounting, glazing panel 24 is positioned in vehicle 10 with its outer surface 30 flush with respect to vehicle outer skin 18 as shown.

Figure 4:
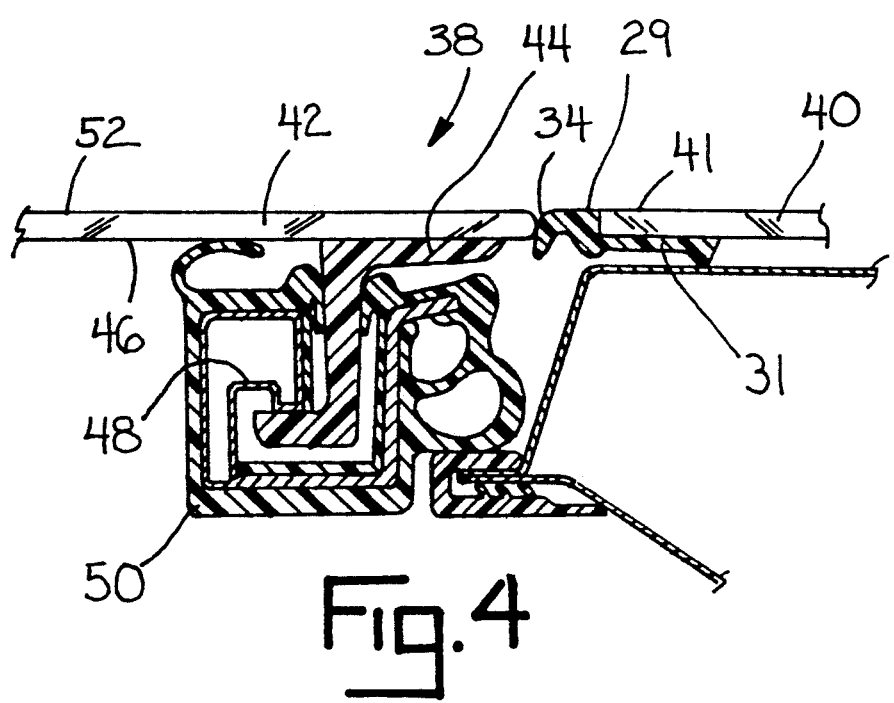
FIG. 4 is a sectional view of the flush mounted glazing as used in a guided movable window.

FIG. 4 illustrates the glazing in use on a movable window 38 which is positioned adjacent a stationary glazing panel 40. A mounting member or inner segment 31 is bonded to panel 40 and includes a lip 34 which extends from panel side edge 29 to movable window 38. Lip 34 serves as a seal to fill the area between movable window 38 and panel 40. Window 38 includes glazing panel 42 and inner segment 44 mounted to panel inner surface 46 as shown, preferably by the RIM process. As shown, inner segment 44 is positioned within guide 48 and is a conventional movable window item along the guide. Guide 48 is surrounded by sealant gasket 50 to allow the glazing panel 42 to slide vertically up and down upon turning a hand crank (not shown) or actuating a power assist motor (not shown). At all times, outer surface 52 of panel 42 will be flush with respect to outer surface 41 of window 40.

It is understood that the above description does not limit the invention to those precise details, and that the invention may be modified within the scope of the following claims.

I claim:

1. Automotive glazing comprising a vehicle frame defining a window opening, a translucent glazing panel having an outer surface and an inner surface fitted in said frame, and mounting means positioned between the frame and a peripheral edge of the glazing panel in abutment with the frame, said mounting means bonded to said inner surface free of said outer surface of the glazing panel and including a lip, said vehicle frame including an outer skin, said glazing panel mounted flush with respect to the outer skin of said vehicle frame with said lip of the mounting means extending from the glazing panel to said outer skin.

2. Automotive glazing comprising a vehicle frame defining a window opening, a translucent glazing panel having an outer surface and an inner surface fitted in said frame, and an inner segment positioned between the frame and a peripheral edge of the glazing panel extending into a guide, said inner segment bonded to the inner surface free of said outer surface of the glazing panel and constituting means for guided movement along said guide as said glazing panel slides vertically upward and downwardly relative to said vehicle frame.

3. Automotive glazing of claim 2 including a second translucent glazing panel having an outer surface and an inner surface fitted in said frame, and other mounting means positioned between the frame and a peripheral edge of the second glazing panel, said other mounting means bonded to said inner surface free of said outer surface of the second glazing panel and including a lip, said first mentioned glazing panel mounted flush with respect to the outer skin of said vehicle frame and the second glazing panel, said lip of the other mounting means extending from said second glazing panel to said outer skin.

* * * * *